No. 793,179. PATENTED JUNE 27, 1905.
W. W. CLARK.
VEHICLE TIRE.
APPLICATION FILED JAN. 3, 1905.
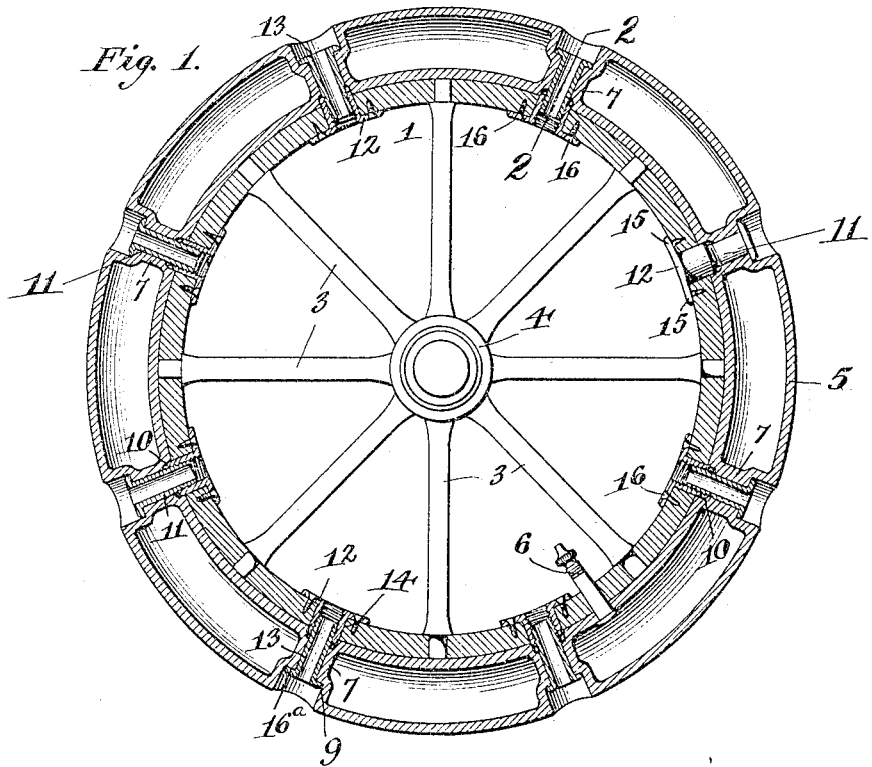
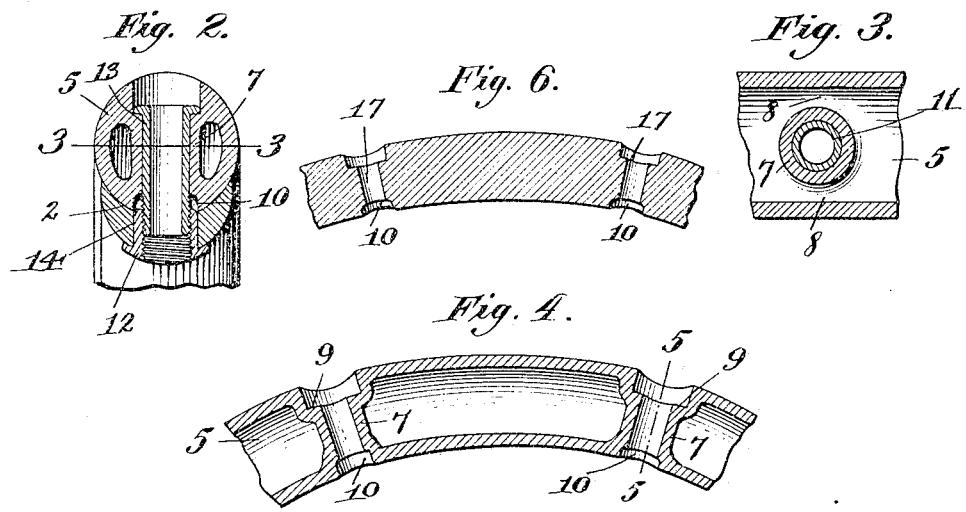
Witnesses: Willie W. Clark, Inventor.

No. 793,179. Patented June 27, 1905.

UNITED STATES PATENT OFFICE.

WILLIE W. CLARK, OF BUFFALO, NEW YORK.

VEHICLE-TIRE.

SPECIFICATION forming part of Letters Patent No. 793,179, dated June 27, 1905.

Application filed January 3, 1905. Serial No. 239,451.

*To all whom it may concern:*

Be it known that I, WILLIE W. CLARK, a citizen of the United States, residing at Buffalo, in the county of Erie and State of New York, have invented certain new and useful Improvements in Vehicle-Tires, of which the following is a specification.

This invention relates to vehicle-tires such as are adapted for use with radial spurs or bars designed to be projected beyond the outer periphery of the tire to increase the traction-power of the vehicle.

The objects of my invention are to provide suitable bushings within the tire for the radial spurs or bars which are used in connection therewith, to so construct said bushings that in a measure they serve to secure the tire to the felly while permitting compression of the tire under the weight of the vehicle without in the least affecting the same or its traction, and to provide a reliable construction which will permit easily attaching or detaching the tire without the aid of skilled labor.

To these ends the invention consists in the construction, arrangement, and combination of parts to be hereinafter described, and particularly pointed out in the appended claims.

In the drawings, Figure 1 is a circumferential section of a vehicle-wheel equipped with my improvements. Fig. 2 is an enlarged transverse section taken on line 2 2, Fig. 1. Fig. 3 is a fragmentary longitudinal section taken on line 3 3, Fig. 2. Fig. 4 is a fragmentary vertical longitudinal section of the tire. Fig. 5 is an enlarged transverse section taken on line 5 5, Fig. 4. Fig. 6 is a fragmentary longitudinal section of a solid tire constructed according to and equipped with my improvements.

Referring to the drawings in detail, like numerals of reference refer to like parts in the several figures.

The numeral 1 designates the vehicle-wheel having the usual circumferentially-grooved rim 2, spokes 3, and the hub 4. In the circumferential groove of the rim the tire 5 is seated, it having the usual valve-stem 6 extending through the rim of the wheel and being preferably cylindrical in cross-section. The air-space in the tire is continuous, and intersecting said space are tubular stems 7, disposed radially and connecting the cylindrical wall of the tire at diametrically opposite points. Said tubular stems are preferably formed integral with the walls of the tire and are of course elastic to permit of compression under the weight of the vehicle, so that the resiliency of the tire is not affected in the least. Said stems are also of less diameter than the tire, so as to provide spaces 8 on opposite sides thereof and render the air-space continuous, and their outer ends are enlarged to provide a shoulder 9 in the interior thereof. The openings in the stems are also enlarged at their inner ends, as at 10, for a purpose to be presently described.

Metallic bushings 11 are held in the hollow stems to provide guides for radial spurs or rods, which extend into the tire and are adapted to be projected beyond the periphery of the latter to increase the traction-power. These bushings are formed in two parts 12 and 13, the first of these, which for convenience I will term the "securing" part, being inserted in openings 14 in the rim alined with the openings in the stems 7 and extending into the enlarged lower ends 10 of the stem-openings. The securing parts 12 are threaded interiorly and are provided with flanges 15 at their inner ends, having screw-holes through which screws 16 are passed and enter the rim of the wheel to secure said parts securely in place. The parts 13, which I will term "guide" parts, are inserted into the tubular stems 7 from the outer periphery of the tire, each guide part having its inner end provided with an exterior screw-thread to fit into a securing part 12, the diameter of the latter being necessarily larger, so that the parts 13 serve as the actual guides for the radial traction spurs or rods when used. On the upper end of each guide part 13 is formed a circumferential flange 16ª, which normally bears against the shoulder 9 of the stem in which it is held, thereby limiting the extent to which the guide parts are screwed into the securing parts and at the same time serving to hold the tire securely to the rim.

Under weight of the vehicle the tire is compressed somewhat, and as the bushings are brought within the zone of compression the stems are compressed and the shoulders 9 are moved out of contact with the flanges 16ᵃ on the bushings, the enlarged outer ends of the stem-openings being of sufficient depth to protect the flanged outer ends of the bushings under the greatest weight to which the tire may be subjected.

In Fig. 6 I have shown a solid tire, and in such cases the tire is provided with radial bores or openings 17, enlarged at their inner ends to receive the upper ends of the interiorly-threaded securing parts 12 of the bushing and being also enlarged at the outer ends to receive the flange 16ᵃ of the exteriorly-threaded guide part 13. By this construction I obtain rigid guides for the radial traction-spurs to be used in connection therewith, while permitting the tire to yield under the weight of the vehicle without being affected in the least by said guides. This construction also permits readily attaching or detaching the tire.

Having thus described my invention, what I claim is—

1. The combination with the wheel-rim, of a tire having radial openings therein, and bushings in said openings secured to the wheel-rim.

2. The combination with the wheel-rim having radial openings therein, of a tire also provided with radial openings alined with the openings in the rim, and two-part bushings in the alined openings, one part of each bushing being secured to the rim and the other part being held in the tire-openings and secured with its lower end to the first-mentioned part.

3. The combination with the wheel-rim having radial openings therein, of a tire having radial openings alined with the openings in the rim, two-part bushings held in said alined openings and comprising securing parts secured in the wheel-rim and provided with internal screw-threads, and guide parts having their inner ends exteriorly threaded and entering the securing parts.

4. The combination with the wheel-rim having radial openings therein, of a tire having radial openings alined with the openings in the rim, two-part bushings held in said alined openings and comprising interiorly-threaded securing parts held in the radial openings in the rim and having each a flange at its inner end for securing the same to the rim and guide parts held in the openings in the tire and having their inner ends exteriorly threaded and fitting into the securing parts.

5. The combination with the wheel-rim having radial openings therein, of a tire provided with radial openings alined with the openings in the rim, each opening in the tire having its outer end enlarged to form a shoulder, bushings held in said alined openings and comprising interiorly-threaded securing parts held in the openings in the rim and having each a flange at its inner end lying against the rim and guide parts held in the openings in the tire and having their inner ends exteriorly threaded to enter the securing parts and their outer ends provided with flanges lying normally against the shoulders in the tire-openings, and screws passing through the flanges of the securing parts and entering the rim.

6. The combination with the wheel-rim, of a hollow tire having hollow radial stems connecting the walls of the tire at diametrically opposite points, and bushings held in said hollow stems and secured to the wheel-rim.

7. The combination with the wheel-rim, of a pneumatic tire having hollow radial stems connecting the walls of the tire at diametrically opposite points, said stems being of less diameter than the air-space in the tire to provide spaces between the walls of the latter and the stems, and bushings held in said stems and secured to the wheel-rim.

In testimony whereof I have affixed my signature in the presence of two subscribing witnesses.

WILLIE W. CLARK.

Witnesses:
CHAS. F. BURKHART,
EMIL NEUHART.